United States Patent
Barratt

(10) Patent No.: US 10,417,740 B2
(45) Date of Patent: Sep. 17, 2019

(54) IMAGE PROCESSING

(71) Applicant: Lachlan Barratt, Summer Hill (AU)

(72) Inventor: Lachlan Barratt, Summer Hill (AU)

( * ) Notice: Subject to any disclaimer, the term of this patent is extended or adjusted under 35 U.S.C. 154(b) by 0 days.

(21) Appl. No.: 15/514,478

(22) PCT Filed: Sep. 26, 2015

(86) PCT No.: PCT/AU2015/050577
§ 371 (c)(1),
(2) Date: Mar. 24, 2017

(87) PCT Pub. No.: WO2016/044897
PCT Pub. Date: Mar. 31, 2016

(65) Prior Publication Data
US 2017/0249720 A1    Aug. 31, 2017

Related U.S. Application Data

(60) Provisional application No. 62/056,345, filed on Sep. 26, 2014, provisional application No. 62/091,327, filed on Dec. 12, 2014.

(51) Int. Cl.
G06K 9/32    (2006.01)
G06T 3/40    (2006.01)
(Continued)

(52) U.S. Cl.
CPC .................. *G06T 3/40* (2013.01); *G06T 3/60* (2013.01); *G06T 7/60* (2013.01); *G06T 5/10* (2013.01)

(58) Field of Classification Search
CPC ........... G06F 3/165; G06T 2207/20024; G06T 2207/20172; G06T 5/00; G10L 21/0332;
(Continued)

(56) References Cited

U.S. PATENT DOCUMENTS 7,437,018 B1 * 10/2008 Amirghodsi .......... G06T 3/0006
382/293
7,474,759 B2 * 1/2009 Sternberg .......... G06F 17/30247
382/100

(Continued)

OTHER PUBLICATIONS

Lehmann, T. M. et al., "Survey: interpolation methods in medical image processing", IEEE Transactions on Medical Imaging, Nov. 1999, pp. 1049-1075, vol. 18 issue 11.
(Continued)

*Primary Examiner* — Bhavesh M Mehta
*Assistant Examiner* — Ian L Lemieux
(74) *Attorney, Agent, or Firm* — Maschoff Brennan

(57) ABSTRACT

Method of processing a digital image comprising increasing the sample resolution of the digital image from a predetermined resolution including neighboring sample points to an increased resolution including intermediate sample points between adjacent of the neighboring sample points, and populating each of the intermediate sample points depending on the influence of a predetermined number of the neighboring sample points, wherein the influence of the predetermined number of neighboring points are weighted substantially proportional to the proximity of the neighboring sample points relative to the respective intermediate sample points. Also a computer or device-readable medium and a computer system.

11 Claims, 12 Drawing Sheets

(51) Int. Cl.
  *G06T 3/60* (2006.01)
  *G06T 7/60* (2017.01)
  *G06T 5/10* (2006.01)

(58) Field of Classification Search
  CPC ........... H03H 17/0248; H03H 17/0266; H03H 17/0286; H03H 17/0657; H04R 1/22; H04R 3/04
  See application file for complete search history.

(56) References Cited

U.S. PATENT DOCUMENTS

| | | | |
|---|---|---|---|
| 7,777,812 B2* | 8/2010 | Sun | G06T 3/4007 348/448 |
| 7,817,871 B2* | 10/2010 | Chaudhury | G06T 3/403 382/256 |
| 8,260,089 B2* | 9/2012 | Tonisson | G06T 5/002 348/240.2 |
| 9,390,469 B2* | 7/2016 | Huang | G06T 3/4007 |
| 2003/0077000 A1* | 4/2003 | Blinn | G06T 3/4007 382/260 |
| 2007/0110333 A1* | 5/2007 | Kondo | G06K 9/4609 382/276 |
| 2009/0161990 A1* | 6/2009 | Tonisson | G06T 5/002 382/286 |

OTHER PUBLICATIONS

Gonzalez, R. C. et al., Digital Image Processing (2nd Edition), Prentice Hall, Jan. 2002. [retrieved from Internet on Dec. 11, 2015].

* cited by examiner

IMAGE PROCESSING

TECHNICAL FIELD

The present invention relates broadly to a method of processing a digital image. The invention also relates broadly to a computer or device-readable medium for processing a digital image, and a computer system for processing a digital image.

BACKGROUND ART

Digital image processing falls broadly into two fields of application, namely improving pictorial information for interpretation by the eye, and processing a digital signal representative of an image by applying signal processing techniques to it. The present application is concerned with image signal-processing techniques typically implemented in software. Image processing techniques are generally based on Fourier transforms which transform signals between the time or spatial domain to the frequency domain. In mathematically processing image signals it is more convenient to operate in the frequency domain. In filtering a digital image the filter may be applied to the image by convolution in the time domain. This convolution is mathematically demanding but can be performed more simply in the frequency domain by using the relevant Fourier transforms.

SUMMARY OF INVENTION

According to a first aspect of the invention there is provided a method of
processing a digital image, said method comprising the steps of;
increasing the sample resolution of the digital image from a predetermined resolution including neighbouring sample points to an increased resolution including intermediate sample points between adjacent of the neighbouring sample points;
populating each of the intermediate sample points depending on the influence of a predetermined number of the neighbouring sample points, the influence of the predetermined number of neighbouring points being weighted substantially proportional to the proximity of the neighbouring sample points relative to the respective intermediate sample points.

Preferably the digital image includes a grid of pixels each located at respective of the neighbouring sample points and arranged in m columns and n rows. More preferably the step of increasing the sample resolution involves enlarging the digital image in at least one of orthogonal x, y axes to expose additional pixels at each of the intermediate sample points to provide an enlarged grid including am columns and bn rows where a and b represents the expansion factors in the x and y axes, respectively.

Preferably the step of populating each of the intermediate sample points involves (i) representing one of the neighbouring sample points by a waveform indicative of the neighbouring sample point and oriented in a z-axis substantially orthogonal relative to the grid of pixels (ii) rotating the indicative waveform about the neighbouring sample point to intersect with the intermediate sample point (iii) deriving a weighted value for that neighbouring sample point from its intersection value at the intermediate sample point. More preferably each of the indicative waveforms is represented in the spatial domain by a mathematical function and the waveforms are each symmetrical either side of the respective neighbouring sample point. Alternatively the indicative waveforms are symmetrical either side of a point midway between the respective neighbouring sample point and the intermediate sample point. Even more preferably the step of populating each of the intermediate sample points involves combining the weighted values for the indicative waveforms of the predetermined number of neighbouring sample points.

Alternatively the step of populating each of the intermediate sample points involves (i) representing each of the respective intermediate sample points by a hypothetical waveform indicative of one of the neighbouring sample points and oriented in a z-axis substantially orthogonal relative to the grid of pixels (ii) rotating the hypothetical waveform about the intermediate sample point to intersect with the neighbouring sample point (iii) deriving a weighted value for that neighbouring sample point from its intersection value. In this embodiment each of the hypothetical waveforms is represented in the spatial domain by a mathematical function and the waveforms are each symmetrical either side of the intermediate sample point. Alternatively the hypothetical waveforms are expanded in the space domain. In these embodiments the step of populating the intermediate sample points involves combining the weighted values for the hypothetical waveforms of the predetermined number of the neighbouring sample points.

Preferably the method also comprises the steps of:
providing a digital filter having a sample resolution substantially the same as the predetermined resolution of the digital image, said filter including a mid-point sample and a plurality of neighbouring sample points either side of the mid-point sample;
applying the digital filter to the digital image where:
(i) the mid-point sample of the filter is applied to a corresponding sample point of the image;
(ii) the neighbouring sample points of the filter are applied to respective of the intermediate sample points, or the neighbouring sample point, of the signal.

More preferably the filter is expanded in the spatial domain prior to its application to the image. Even more preferably the filter is expanded by an expansion factor which is a whole number greater than one (1) and is typically two (2).

Preferably the step of applying the filter involves applying said filter at an adjusted sampling rate inversely proportional to the expansion factor. More preferably the filter is applied to the neighbouring sample points as a dot product at half (½) the predetermined resolution.

Preferably the method also comprises the step of resizing or reshaping the image by deleting one or more neighbouring or intermediate sample points of the enlarged grid according to a predetermined sizing, or reshaping algorithm. More preferably this resizing or reshaping involves deletion of one or more of the am columns and/or bn rows of the enlarged grid. Alternatively or additionally the method comprises shifting the enlarged digital image by translating predetermined of the neighbouring sample points from existing locations in the enlarged grid to target locations in the enlarged grid according to a predetermined shifting algorithm. Even more preferably the sizing and/or shifting algorithms are in the form of filters.

Preferably the waveforms or their waveform components are represented by absolute results of a cosine function in the spatial domain substantially limited to half a cycle at its mid-point. Alternatively the indicative or hypothetical waveforms or components are represented by a sine function of positive values only in the spatial domain. More preferably the waveforms or their components are each modified by applying an averaging curve having a width adjusted proportional to the wavelength of the respective waveform or component.

Preferably the method also comprises a preliminary step of zoning the image into resolution zones and combining values for two or more of the neighbouring sample points for select zones having relatively low frequency content to provide a modified zone having substantially the same number of sample points as the select zone. More preferably the step of combining values involves combining two or more common sample points from the neighbouring sample points of the select zone to provide the modified zone having the same number of sample points.

According to a second aspect of the invention there is provided a computer or device-readable medium including instruction for processing a digital image, said instructions when executed by a processor cause said processor to:

increase the sample resolution of the digital image from a predetermined resolution including neighbouring sample points to an increased resolution including intermediate sample points between adjacent of the neighbouring sample points:

populate each of the intermediate sample points depending on the influence of a predetermined number of the neighbouring sample points, said influence being weighted substantially proportional to the proximity of the neighbouring sample points relative to the respective intermediate points.

According to a third aspect of the invention there is provided a computer system for processing a digital image, said system comprising a processor configured to:

increase the sample resolution of the digital image from a predetermined resolution including neighbouring sample points to an increased resolution including intermediate sample points between adjacent of the neighbouring sample points;

populate each of the intermediate sample points depending on the influence of a predetermined number of the neighbouring sample points, said influence being weighted substantially proportional to the proximity of the neighbouring sample points relative to the respective intermediate points.

BRIEF DESCRIPTION OF DRAWINGS

In order to achieve a better understanding of the nature of the present invention a preferred embodiment of a method of digitally processing an image will now be described, by way of example only, with reference to the accompanying drawings in which.

DESCRIPTION OF EMBODIMENTS

The present invention is directed broadly to a method of processing a digital image typically rendered in the form of a grid of pixels arranged in m columns and n rows. The image processing may be performed in the course of one or more image manipulation operations including rotating, translating, enlarging, or reducing an image. The image processing may be embodied in computer program code or software such as a plugin. The computer code or software is stored on a memory device with computer executable instructions that cause the computer to execute certain functions as described. The preferred embodiments are described in the context of a 2D image although the principles equally apply to rendering of the image in 3D. Although the preferred embodiment is described in the context of still digital images, the invention is to extend to digital video. In video the techniques described in the preferred embodiments are equally applicable where the video can be considered multiple frames or samples of still images.

Figure 1:
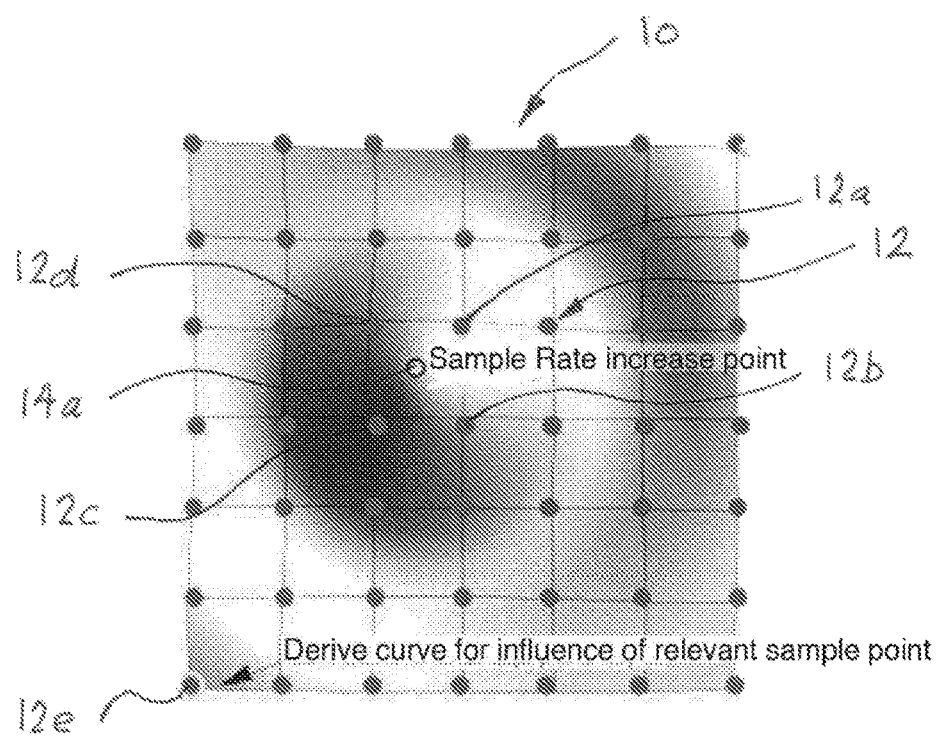
FIG. 1 is a schematic illustration of a technique involved in processing a digital image according to an embodiment of the invention.
Figure 2:
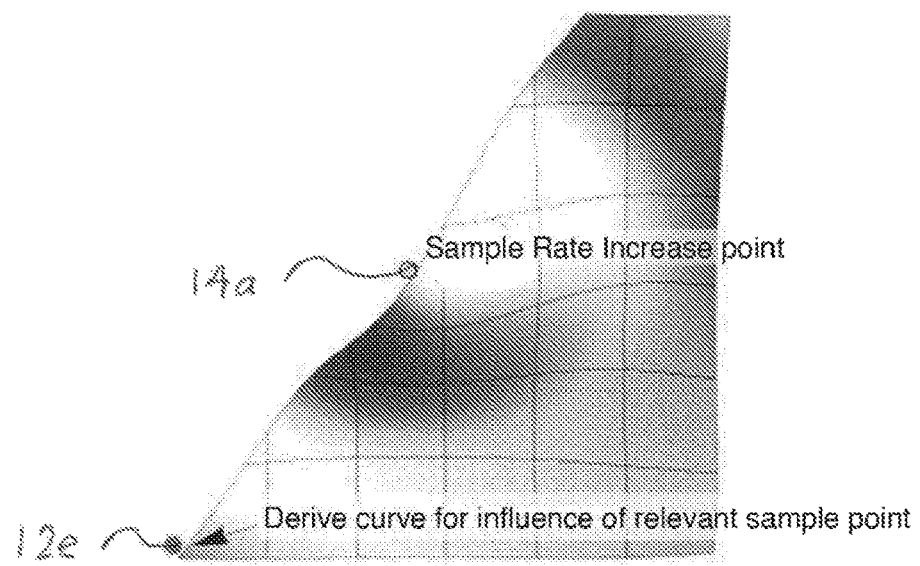
FIG. 2 is a schematic cutaway view of part of the image of FIG. 1.

In the preferred embodiment of FIGS. 1 and 2 the digital image is represented or rendered at least in part by a grid of pixels 10 arranged in m columns and n rows where m and n each equal seven. The solid circles or dots each represent neighbouring sample points 12 for the pixel grid 10. The sample resolution of the digital image is broadly defined by the number of neighbouring sample points 12 within a space occupied by the image or in this case 49 pixels.

In this example the sample resolution is increased by including intermediate sample points between adjacent of the neighbouring sample points such as 12a to 12d. For ease of understanding the sample resolution is increased by inserting one additional column and row of sample points between adjacent columns and rows of the grid of pixels 10. Each grid position within the additional columns and rows is allocated an intermediate sample point such as 14a. In practice it is likely that the sample resolution increase and number of intermediate sample points will be significantly greater in order to achieve suitable image resolution.

Increasing the sample resolution effectively means enlarging the digital image in both its orthogonal x and y axes to expose additional pixels at each of the intermediate sample points such as 14a. The resulting enlarged grid at the increased sample resolution will include am columns and bra rows where a and b represents the expansion factors. This means the enlarged grid of this example includes 2×7 or 14 columns, and 2×7 or 14 rows. This equates to an additional 147 intermediate sample points.

The intermediate sample points such as 14a in the enlarged grid are each populated depending on the influence of a predetermined number of the neighbouring sample points 12. In this case the intermediate sample point 14a is deemed to be influenced by all of the neighbouring sample points 12 in the grid 10. Each of the predetermined neighbouring points, such as 12e shown in the corner of the grid 10, has a weighted influence on the intermediate sample point 14a substantially proportional to its relative proximity to that point 14a. In this embodiment the weighted influence of the neighbouring sample points 12 is determined by one of two techniques, namely (1) combining values at the intermediate sample point, or (2) combining values at each of the predetermined neighbouring sample points.

Figure 3A:
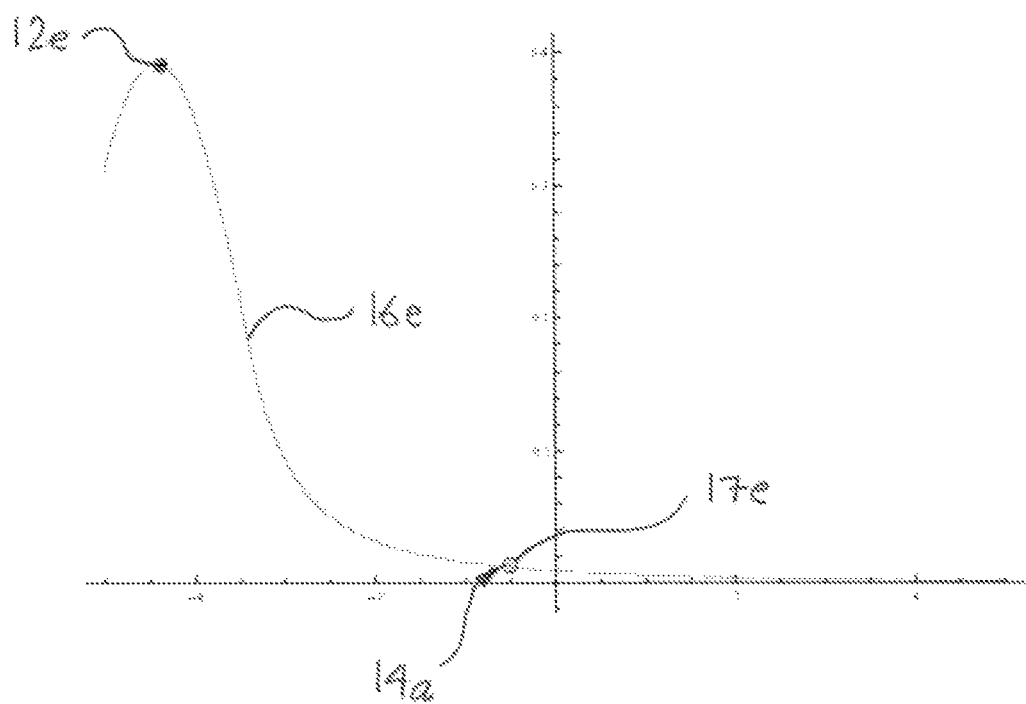
FIG. 3A is graph depicting a waveform used in processing the digital image of the preceding figures according to one technique.

FIG. 3A schematically illustrates the first technique where each of the neighbouring sample points such as 12e is represented by a waveform 16e indicative of that sample point and oriented in a z-axis substantially orthogonal to the grid of pixels 10. The indicative waveform 16e is centred at and rotated about the corresponding sample point 12e to intersect with the intermediate sample point 14a. The intersection value 17e is thus determined at the intermediate sample point 14. These steps are repeated for each of the predetermined neighbouring sample points 12 of the grid 10 to derive weighted values for each of the neighbouring sample points at their intersection with the intermediate sample point 14. The intermediate sample point is then populated with the combined weighted values for the indicative waveforms such as 16e of the respective predetermined neighbouring points 12e.

Figure 3B:
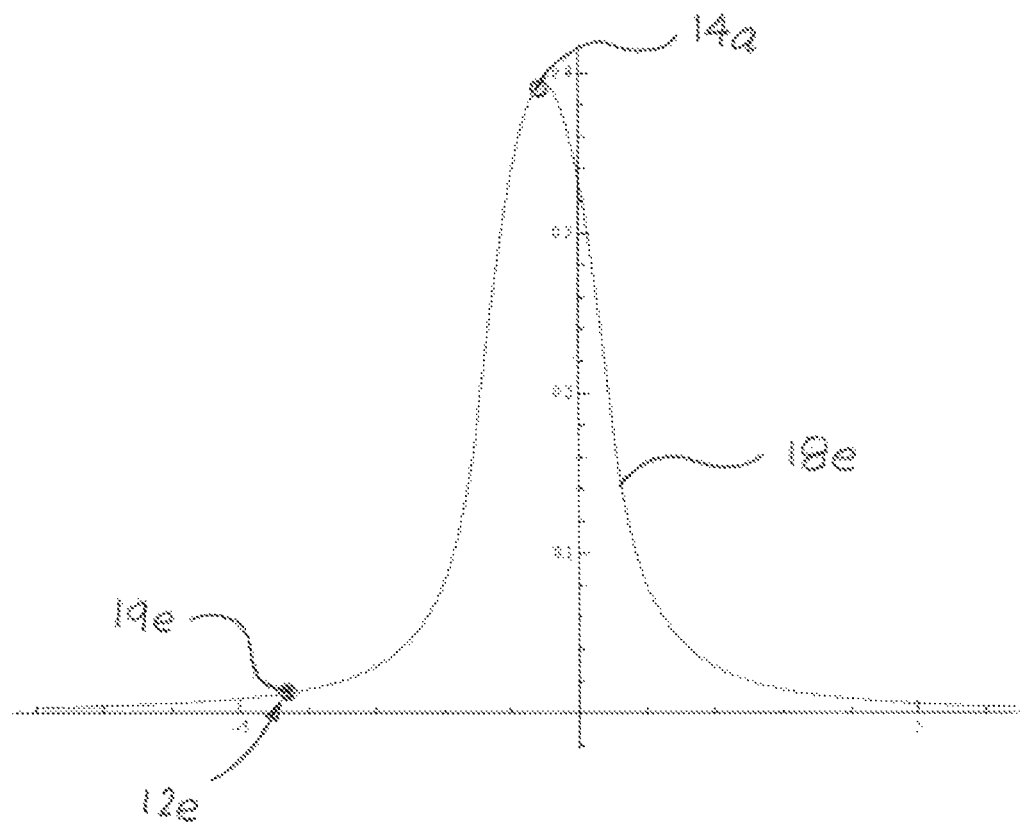
FIG. 3B is a graph depicting a waveform used in processing the digital image according to another technique.

FIG. 3B illustrates the second technique where the intermediate sample points such as 14a are each represented by a hypothetical waveform such as 18e indicative of one of the predetermined neighbouring sample points as 12e. The hypothetical waveform 18e is oriented in a z-axis substantially orthogonal to the grid of pixels 10 in the same manner as the previous technique. The hypothetical waveform 18e is centred at and rotated about the intermediate sample point 14a to intersect with the relevant neighbouring sample point such as 12e. The intersection of the hypothetical waveform 18e at the neighbouring sample point 12e provides a weighted value 19e for that neighbouring point. These steps are repeated for each of the other predetermined neighbouring sample points 12. The weighted values for the hypothetical waveforms intersecting at the predetermined neighbouring points are combined in order to populate the intermediate sample point such as 14a.

In alternative embodiments the weighted influence may be calculated for each of the intermediate sample points by either of the following techniques involving:

(1) indicative waveforms at respective neighbouring sample points shifted midway to the intermediate sample point with values combined at the intermediate sample point:

(2) indicative waveform at the neighbouring sample point shifted midway to the intermediate sample point with values combined from the neighbouring sample point.

The other intermediate sample points within the grid 10 are similarly populated using either of these techniques. In either case the indicative or hypothetical waveforms 16 or 18 are in this embodiment constructed at least in part from cosine components represented by absolute results of a cosine function in the spatial domain substantially limited to half a cycle at its mid-point. The half-cycle cosine components are summed across the relevant frequency range and this is represented in the computational software program Mathematica as follows:

$$\text{If}\left[\sqrt{x^2+y^2} < \frac{1}{4lpf},\right.$$

$$\int_0^{lpf} \frac{\cos\left[2\pi\sqrt{x^2+y^2}\,componentFreq\right]}{\int_{-\frac{1}{4componentFreq}}^{\frac{1}{4componentFreq}} \cos\left[2\pi\sqrt{x^2+y^2}\,componentFreq\right]d\left(\sqrt{x^2+y^2}\right)} dcomponentFreq,$$

$$\int_0^{\frac{1}{4\sqrt{x^2+y^2}}} \frac{\cos\left[2\pi\sqrt{x^2+y^2}\,componentFreq\right]}{\int_{-\frac{1}{4componentFreq}}^{\frac{1}{4componentFreq}} \cos\left[2\pi\sqrt{x^2+y^2}\,componentFreq\right]d\left(\sqrt{x^2+y^2}\right)}$$

$$\left. dcomponentFreq\right]$$

Where x and y are Cartesian coordinates for the intermediate sample point relative to the neighbouring sample point and lpf is equivalent to the Nyquist frequency for the image pixels.

Figure 4:
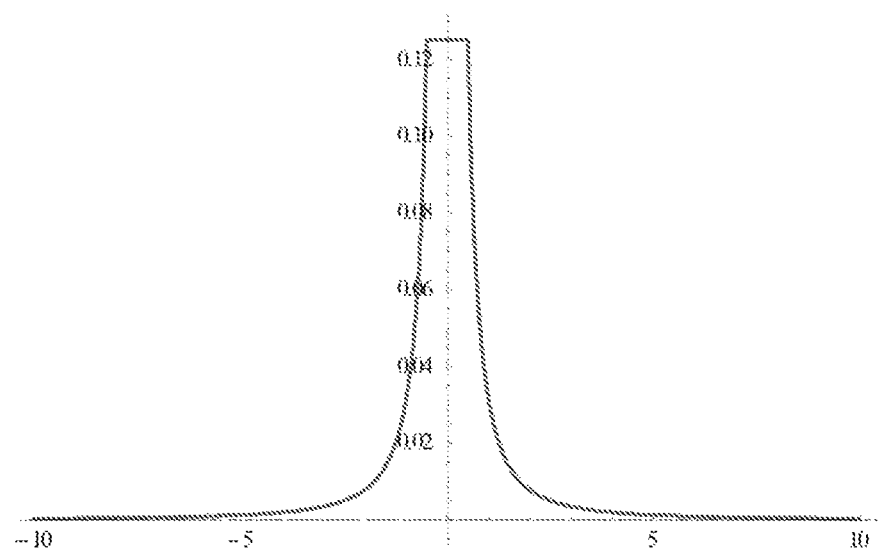
FIG. 4 is a graph of an alternative representative waveform obtained by combining square-wave components.

Alternatively the indicative or hypothetical waveforms are constructed from the following components:

(1) Sine functions for absolute values represented in the spatial domain;

(2) Sine functions for values in the spatial domain from zero (0) to positive infinity only;

(3) Sinc functions (sum of cos components) for values in the spatial domain from zero (0) to positive infinity only;

The waveform components may also be represented by absolute results of a square wave function in the spatial domain substantially limited to half a cycle. The half-cycle square-wave components are summed across the relevant frequency range and this is shown in FIG. 4 and represented in Mathematica as follows:

$$\text{If}\left[x < \frac{1}{4\,lpfHighest}, \int_0^{lpfHighest} lpfdlpf, \int_0^{\frac{1}{4x}} lpfdlpf\right]$$

$$\text{If}\left[x < \frac{1}{4\,lpfHighest}, \frac{lpfHighest^2}{2}, \frac{1}{32x^2}\right]$$

$$\text{Plot}\left[\text{If}\left[\text{Abs}[x] < \frac{1}{4\,lpfHighest}, \frac{lpfHighest^2}{2}, \frac{1}{32x^2}\right] / .\,lpfHighest \to 1/2,\right.$$

$$\left.(x, -10, 10), PlotRange \to \text{All}\right]$$

Figure 5A:
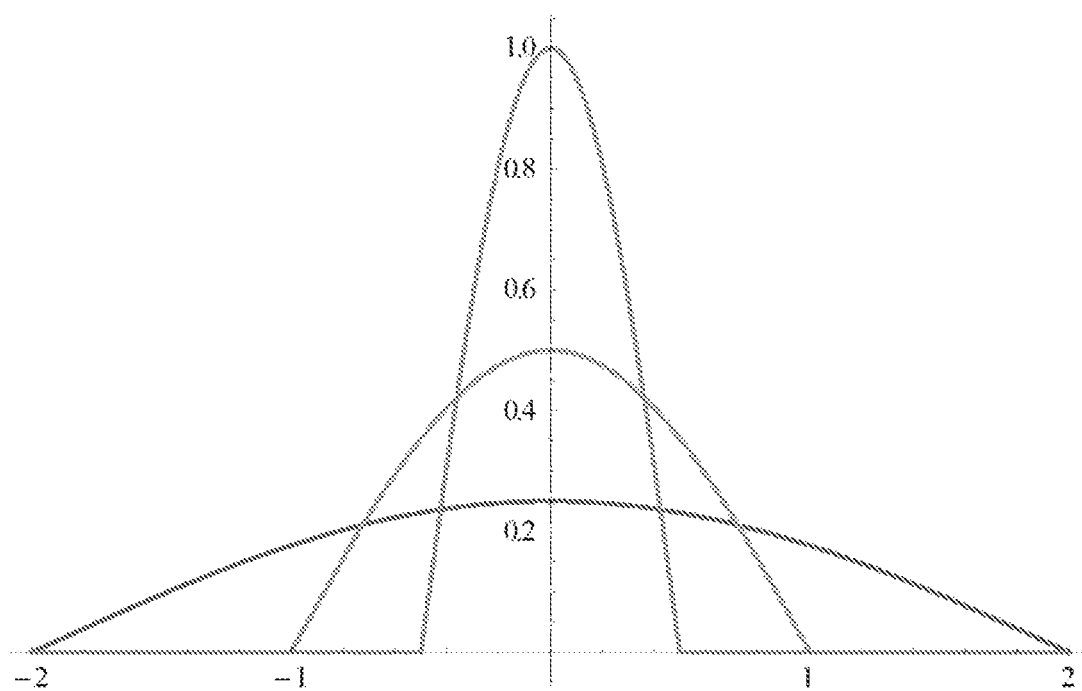
FIGS. 5A and 5B are alternative waveform components used to obtain waveforms for calculating weightings.
Figure 5B:
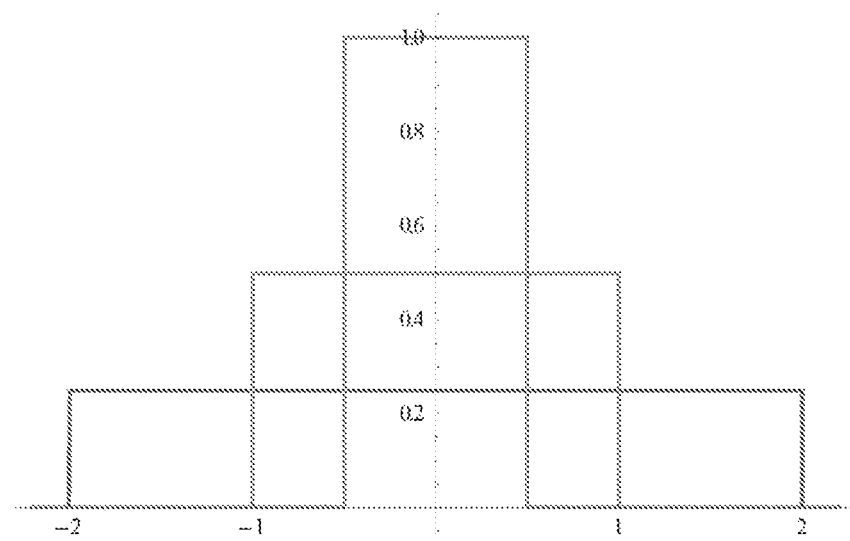

The waveform components are each preferably weighted for substantially equal contribution to the indicative or hypothetical waveform. This weighting is shown in the formulae above and may also be approximated as equal areas under each of the waveform component curves. FIGS. 5A and 5B show examples of weighted waveform components for the half cycle cosine function and the square wave function, respectively.

Alternatively the indicative or hypothetical waveforms may be constructed by combining waveforms substantially representing x and y coordinates. The indicative waveform of the first technique is produced at each of the neighbouring sample points by multiplying the indicative waveform representing the x coordinate with the indicative waveform representing the y coordinate. The indicative waveforms of the x and y coordinates are obtained by summing the relevant waveform components for the x and y coordinates respectively. To produce the hypothetical waveform of the second technique at the intermediate sample point, the hypothetical waveform representing the x coordinate is multiplied with the hypothetical waveform representing the y coordinate. The hypothetical waveforms of the x and y coordinates are obtained by summing the relevant waveform components for the x and y coordinates respectively. The weightings are then calculated for the first or second techniques by using intersection values for the indicative waveform(s) or the hypothetical waveform at the intermediate sample point or the neighbouring sample points, respectively.

The filter may be constructed from waveforms or waveform components substantially represented by other mathematical functions. For example, the filter may be represented by the equation:

$$n*n/((n-lpf\ x)*(n+lpf\ x))$$

where n is a constant depending on the desired shape, and lpf is equivalent to the Nyquist frequency for the image pixels. In this variation the variable x is derived from either:

(1) the square root of the sum of the square of each of the x and y Cartesian coordinate components; or (2) the x or y component corresponding to the x or y Cartesian coordinates respectively.

Figure 6:
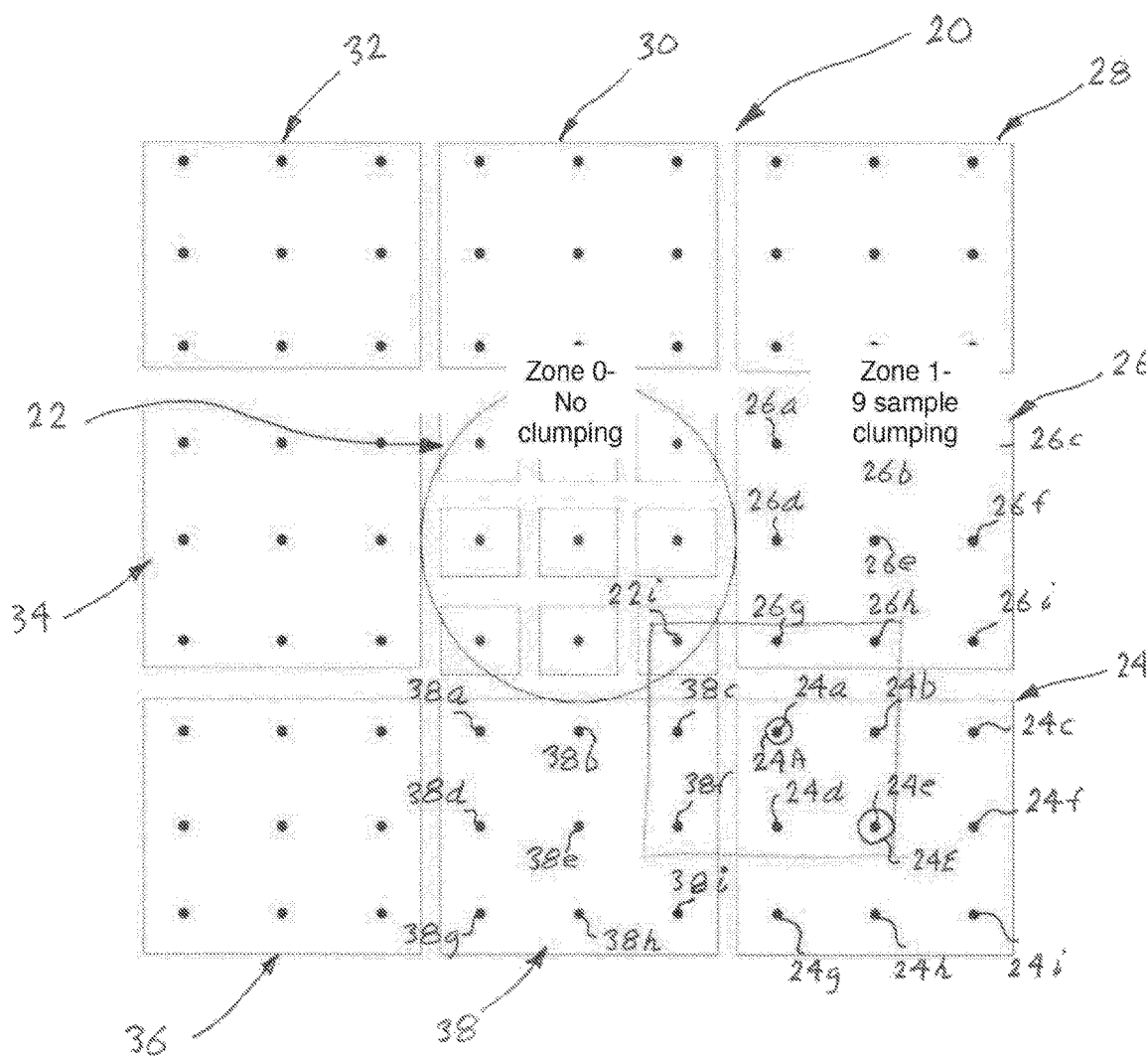
FIG. 6 is a schematic illustration of a preliminary step involved in processing of the digital image in the preferred embodiment of this invention.

In the preferred embodiment the image processing comprises a preliminary step of zoning an image such as 20 into resolution zones. This is schematically shown in FIG. 6 where the digital image 20 includes a central zone 22 surrounded by eight neighbouring zones 24 to 38. The central zone 22 of the image 20 is relatively detailed requiring high resolution rendering whereas the neighbouring zones such as 24 are of relatively coarse detail of low frequency content requiring relatively low resolution rendering.

In this preliminary step the surrounding low resolution zones 24 to 38 are modified by combining neighbouring sample points such as 24a to 24i. The nine neighbouring sample points 24a to 24i are combined with sample points from neighbouring zones to provide a modified zone having substantially the same number of sample points, that is nine (9). This is achieved by combining values for overlapping groups of the neighbouring sample points to derive values in the modified zone. The modified value for the central sample point of zone 24 is designated as 24E and so on for other neighbouring sample points within the zone 24. The modified value 24E is derived from the combination of values 24a to 24i inclusive and adjusted by a divisor to compensate for the number of samples grouped, in this case nine (9). The values for the neighbouring sample points are in this example summed. The derivation of values for the modified zones necessarily involves sample points from adjacent zones. For example, the modified value 24A in the zone 24 is derived from the combination of values 26g and 26h from zone 26; 24a, 24b, 24d, 24e from zone 24; 22i from central zone 22; and 38c, 38f from zone 38.

The modified zones of the image 20 thus have the same number of neighbouring sample points as unmodified zones of the image. This means the grid of the image remains in its original configuration for ease of subsequent image processing such as image filtering. The image may also be zoned without requiring the modified zone to account for the same number of sample points as the zone before modification. The applicant's U.S. provisional patent application No. 61/974,326 describes these alternative zoning techniques. The disclosures of this US provisional patent application are to be considered included herein by nature of this reference.

Figure 7:
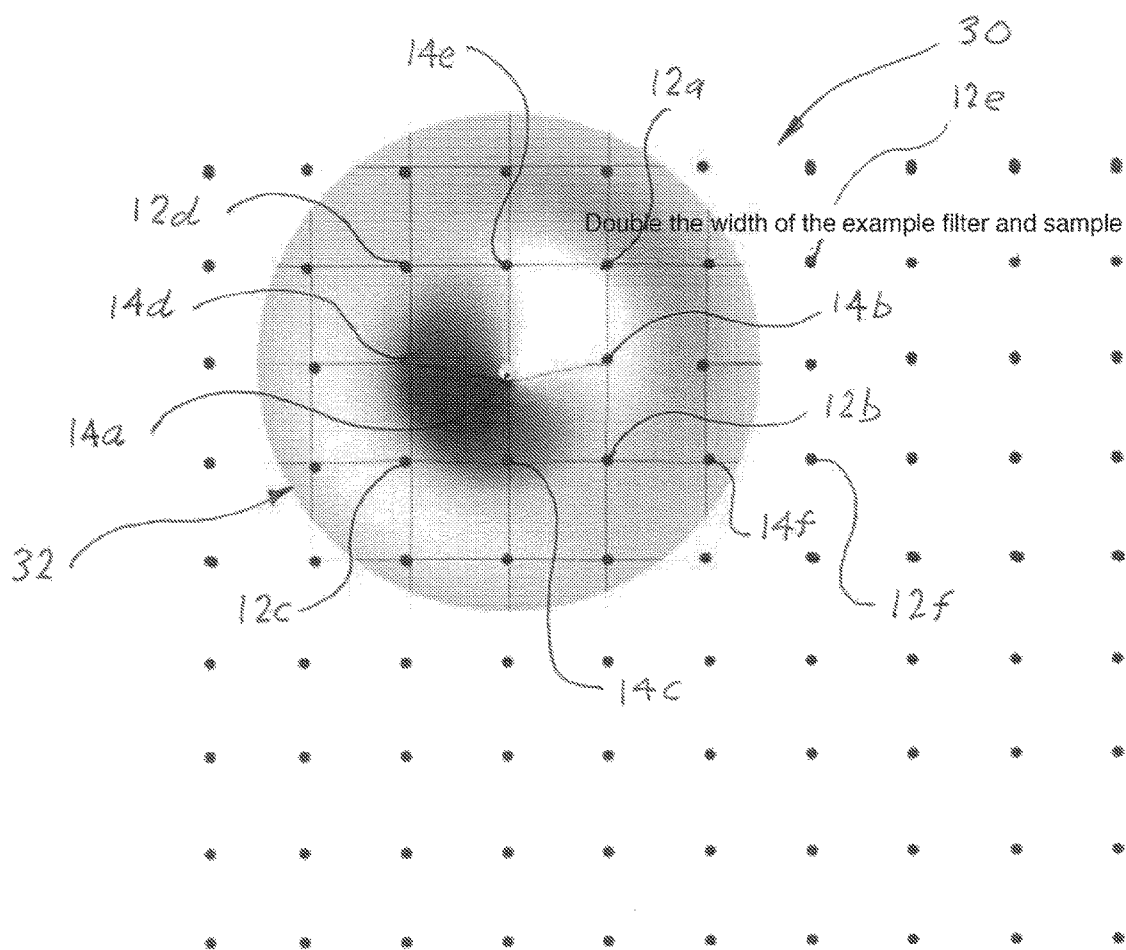
FIG. 7 is a schematic illustration of a filter suitable for application to the digital image according to an embodiment of the invention.

FIG. 7 is a schematic illustration of part of an enlarged grid 30 derived from the image grid 10 having undergone the sample resolution increase with weighting, according to the described embodiments of FIGS. 1 to 3. The enlarged grid 30 thus includes the neighbouring 12 together with the weighted intermediate 14 sample points. For example, the intermediate sample points 14b to 14e surround the central intermediate sample point 14a.

As schematically shown in FIG. 7 the image of the enlarged grid 30 is filtered with a filter 32 representative of the image. In this embodiment a preliminary filter is mathematically represented, at the same sample resolution as the enlarged image, by sine functions (sum of cosine components) with weighting according, to one of the earlier techniques. The filter 32 to be applied to the enlarged image or grid 30 is then constructed by applying the preliminary filter to a hypothetical image represented by binary values (zeros and ones) at the same sample resolution.

Figure 8:
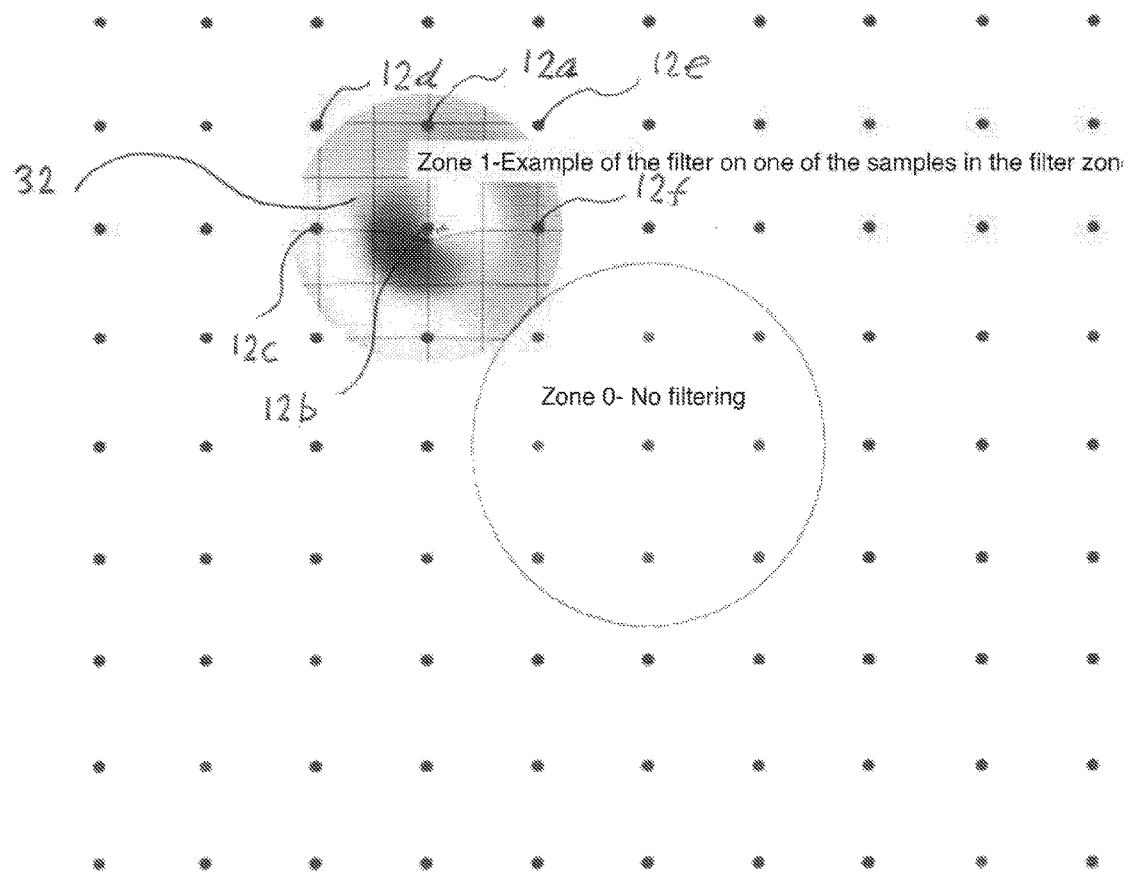
FIG. 8 is a schematic illustration of the application of the filter of FIG. 7 to the digital image.

FIG. 8 schematically illustrates application of the filter 32 to the enlarged grid 30 stepping the filter 32 across the sample points such as 12a to 12f of the enlarged image. The filter 32 is applied to the image as a dot product at high resolution with the benefit of the weighted intermediate sample points as described in the preceding paragraphs. The filter 32 is in this example stepped from its intermediate sample point 14a position in FIG. 7 to its diagonally neighbouring sample point 12b position although this may vary depending on the algorithm adopted in convolving the filter 32 with the image 30. The filter 32 in FIG. 8 is shown at its full resolution with all intersecting grid lines whereas the image is shown at reduced resolution without the intermediate sample points.

Figure 9:
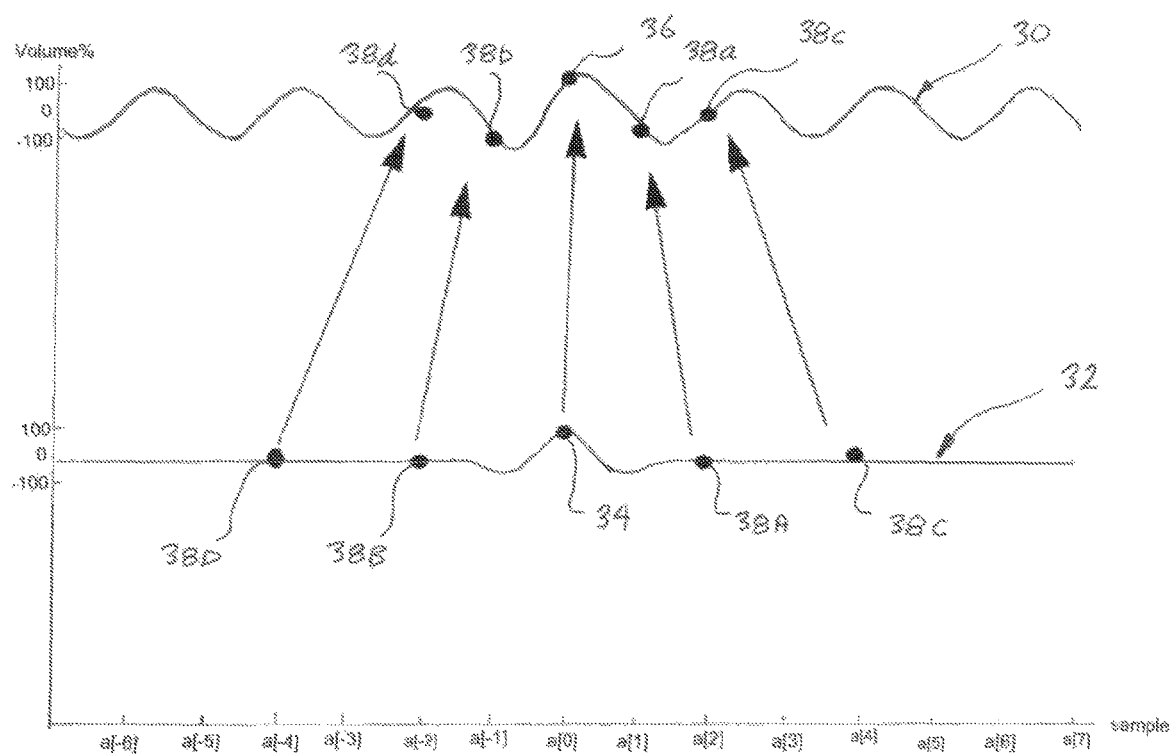
FIG. 9 is a schematic representation of the application of a filter to a digital image according to another embodiment of the invention.

FIG. 9 illustrates a variation on this method of convolution where the filter 32 is applied to the image 30. Both the filter 32 and the image 30 may have undergone a sample rate increase according to one of the earlier techniques. The image filter 32 is in this variation expanded prior to application to the image of the enlarged grid 30 as follows;

(1) The mid-point sample 34 of the filter is applied to a corresponding sample point 36 of the image;

(2) Offset sample points such as 38a to 38d of the image are defined either side of the corresponding sample point of the image, these offset points being offset relative to respective neighbouring sample points of the filter; and (3) The neighbouring sample points such as 38A to 38D of the filter are applied to respective of the offset sample points 38a to 38d of the image.

The filter is applied at its relatively high resolution accounting for the neighbouring and, when a weighted sample rate increase is applied, the intermediate sample points and values. The high resolution filter is expanded to effect offset of its sample points relative to corresponding sample points of the image. The filter as a result of its expansion is in effect applied to the image at an adjusted sampling rate. This adjusted sampling rate is in this case inversely proportional to the expansion factor.

Figure 10:
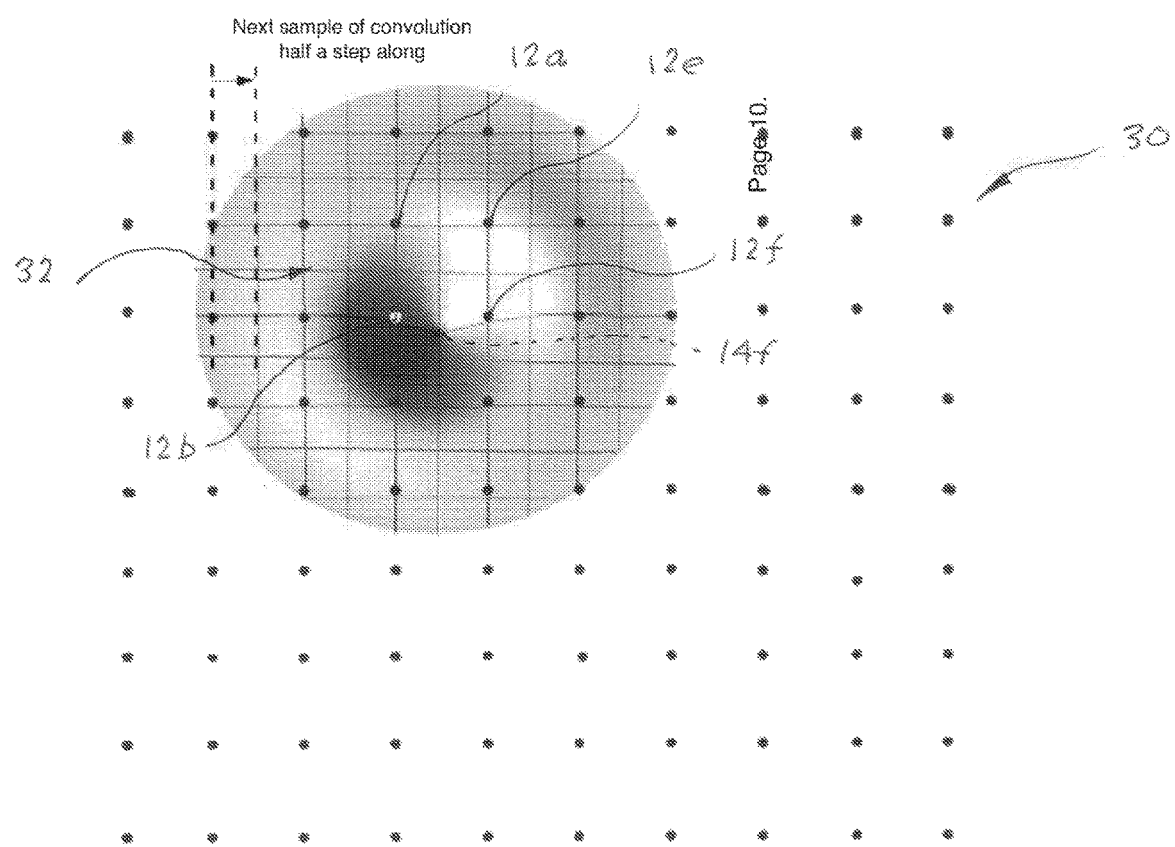
FIG. 10 is a schematic illustration of the application of the filter of FIG. 7 to the digital image at an adjusted sampling rate.

Alternatively the sample points of the high resolution filter may be applied to the corresponding sample points of the image as a dot product at an adjusted sampling rate. This is schematically depicted in FIG. 10 where the filter 32 shifts for example to the intermediate sample point 14f. That is the filter 32 moves across its grid at single filter steps corresponding to the sample rate increase of the filter which offsets it from the neighbouring sample points of the image 30. The applicant's co-pending International patent application No. PCT/AU2014/000325 describes convolution at an adjusted sampling rate primarily in the context of digital audio signals. The disclosures of this PCT application are applicable to digital images and are to be considered included, therein by nature of this reference.

The filter may be applied to the image without the offset described in the context of FIGS. 9 and 10. This means the neighbouring sample points of the filter are applied to respective sample points of the image. The filter is in this case applied as a dot product at its regular sampling rate without adjustment.

Figure 11:
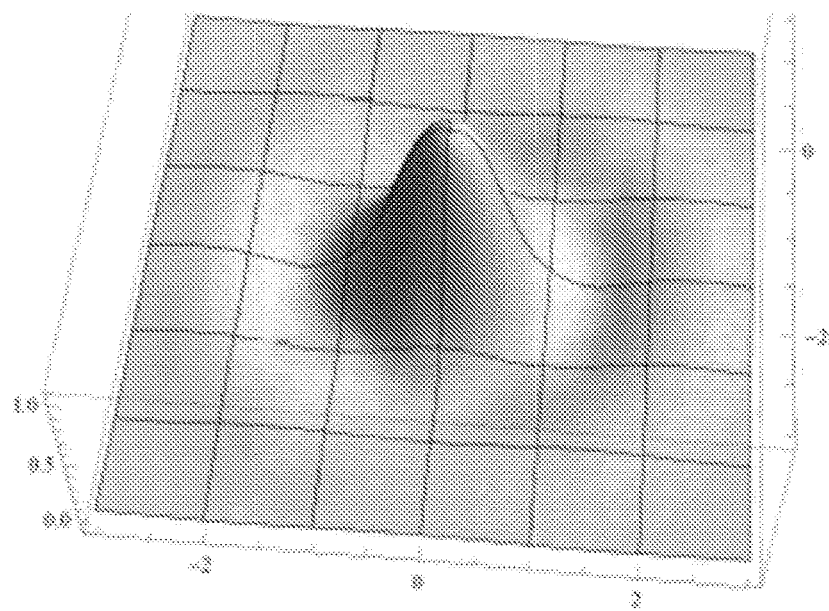
FIG. 11 is a schematic topographic view of an exemplary image filter constructed in accordance with an embodiment of the invention.
Figure 12:
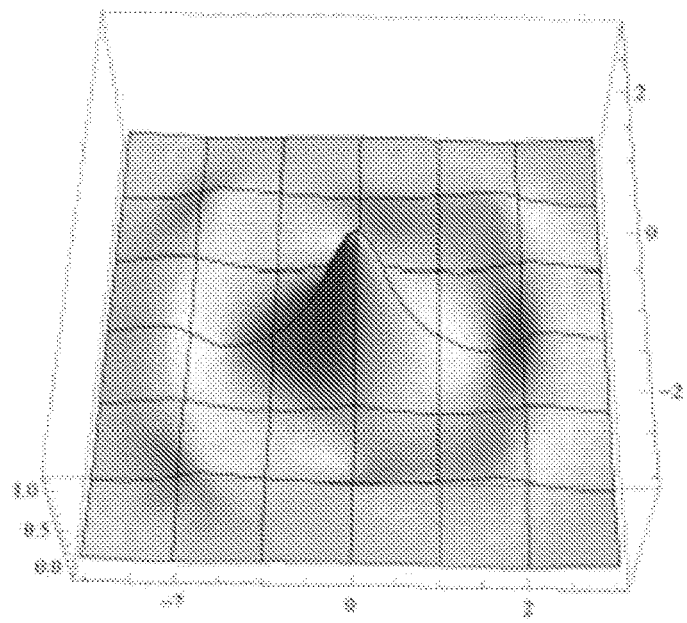
FIG. 12 is a schematic topographic map of a further image filter constructed in accordance with a further embodiment of the invention.
Figure 13:
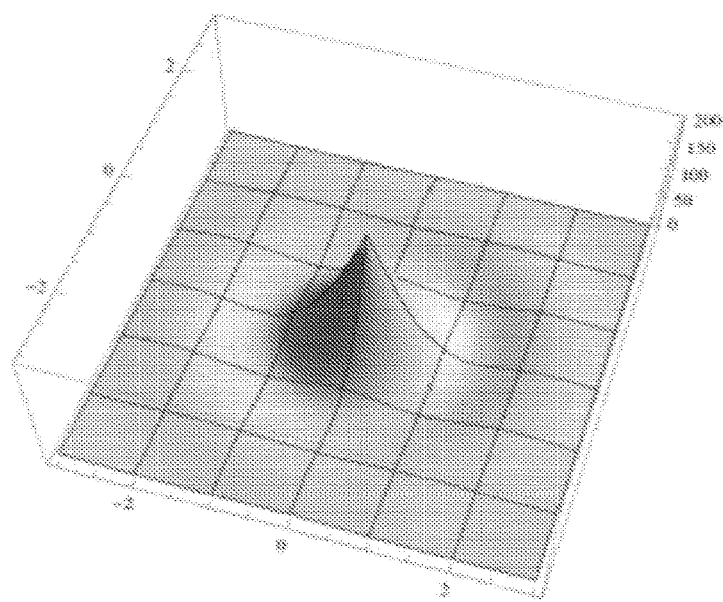
FIG. 13 is a schematic topographic view of another image filter constructed in accordance with another embodiment of the invention.

FIGS. 11 to 13 are schematic topographic views of exemplary filters applied to the digital image of the previous embodiments. The filters are applied to the neighbouring sample points of the enlarged image grid 30. The enlarged image grid 30 typically reverts to its original configuration in the form of the image grid 10 by undergoing a sample resolution decrease. This sample resolution decrease is effected by removing the intermediate sample points of the enlarged grid 30. The filters constructed in accordance with the previous embodiments are represented by waveforms or waveform components represented by:

(1) Sine functions for absolute values in the spatial domain with weighting according to one of the earlier described techniques (see FIG. 11);

(2) Sinc functions (sum of cosine components) with weighting according to any one of the earlier described techniques (see FIG. 12).

The applicant's co-pending International patent application No. PCT/AU20141000317 describes in some detail waveforms or components thereof represented by sine functions for absolute spatial values. The disclosures of this PCT application are to be considered included herein by nature of this reference.

In another variation the filter may be represented by waveform components represented by absolute results of a cosine function in the spatial domain substantially limited to half a cycle at its mid-point. In these embodiments the waveforms or components thereof may be modified by applying an averaging curve having a width adjusted proportional to the wavelength of the respective waveforms or components. This modification of the waveforms is discussed in the applicant's co-pending International patent application No. PCT/AU2014/000321 the disclosures of which are to be considered included herein by nature of this reference.

FIG. 13 illustrates a topographic view of a filter derived from sine functions but without weighting. Although this filter may not be as effective in for example providing clear rendering of a digital image having relative fine detail and requiring high resolution processing, it is nonetheless broadly within the scope and disclosures of the present specification.

Figure 14:
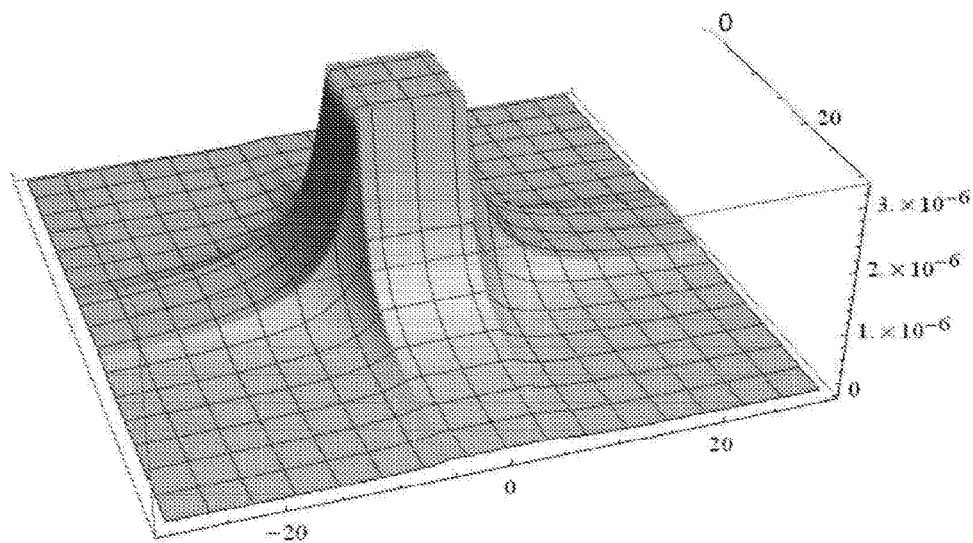
FIG. 14 is a schematic topographic view of yet another image filter constructed in accordance with yet another embodiment of the invention.

FIG. 14 is a topographic view of another filter derived from square-wave components. The representative waveform from which the weightings for the filter are derived is shown in FIG. 4. The waveforms are calculated for each of the x and y coordinates and multiplied to obtain the indicative or hypothetical waveform. This is effectively the same as the techniques of FIGS. 3A and 3B except the cosine components are replaced with square-wave components, and the waveform components separately represent the waveform in the x and y axes.

The described embodiments of the digital image processing have various applications including but not limited to:

(1) anti-aliasing;

(2) enlarging or expanding the digital image;

(3) shifting by translating and/or rotating the digital image.

In the case of anti-aliasing, the intention is to minimise distortion artefacts when representing a relatively detailed image at a lower resolution. In this application the digital image is enlarged and a filter constructed using one of the techniques of the preferred embodiment. The filter is applied to the enlarged image to effect the neighbouring sample points for smoothing of the image. The image then undergoes a sample resolution decrease by in effect removing the intermediate sample points.

In the case of enlarging or expanding, the digital image is processed by insertion of additional or intermediate sample points in the form of additional rows and columns of pixels as described earlier. The number of rows/columns of inserted pixels is proportional to the scale at which the digital image is to be enlarged. The intermediate sample points are then populated according to one of the described techniques of the preferred embodiment. The image may also be smoothed by application of a filter derived from the waveforms adopted in populating the intermediate points. In this application the process may not require a subsequent decrease in the sample resolution.

In the case of image translation, the digital image is enlarged and intermediate sample points populated according to one of the preferred techniques. In order to effect the translation or rotation, the relevant neighbouring and/or intermediate sample points are then moved to target locations in the enlarged grid. This movement is typically effected according to a predetermined shifting algorithm which provides the desired translation or rotation. The shifted and enlarged image then undergoes a sample resolution decrease to revert to its original size.

It is to be understood that the methods and techniques described can be implemented as computer-readable instructions stored on a computer-readable medium. The computer-readable instructions can be executed by a processor of practically any computer system including desktop, portable, tablet, hand-held, and/or any other computer device.

It is also to be understood that the present invention extends to computer-readable media for carrying or having, computer-executable instructions stored thereon. The computer-readable media include RAM, ROM, EEPORM, CD-ROM or other optical disc storage, magnetic disc storages, or any other medium which carries or stores program code means in the form of computer-executable instructions. In the event of information being transferred or provided over a network or another communications connection to a computer, the computer is to be understood as viewing the connection (hardwired, wireless, or a combination thereof) as a computer-readable medium.

The contents of the applicant's following co-pending patent applications are to be taken as incorporated herein by these references:

(1) PCT/AU2014/000318 titled "Audio Sample Rate Increases";
(2) PCT/AU2014/000319 titled "Audio Filtering with Virtual Sample Rate Increases";
(3) U.S. provisional patent application No. 61/974,326 titled "Improved Audio Processing".

Now that several preferred embodiments of the invention have been described it will be apparent to those skilled in the art that the method of processing a digital image has at least the following advantages:

(1) The preferred techniques adopted in increasing the sample resolution of the digital image account for the weighted influence of neighbouring sample points;
(2) The influence of the neighbouring sample points in populating intermediate sample points for the image is weighted for clearer rendering of the image;
(3) The techniques used in determining the overall weighting of the influence of the predetermined number of neighbouring sample points lend themselves to trigonometry;
(4) The trigonometry adopted in the preferred techniques can be expressed n relatively simple algorithms.

Those skilled in the art will appreciate that the invention described herein is susceptible to variations and modifications other than those specifically described. For example, the invention may extend to other applications where increasing the sample resolution of the digital image is required in its processing. The specific techniques in calculating the influence of neighbouring sample points on intermediate sample points are not intended to be limiting. The techniques may involve trigonometric functions other than those described. The image filter(s) may be constructed or represented by fast fourier transform (FFT) algorithms rather than the trigonometric functions described in the preferred embodiments, such as the cosine and/or sine components. It is also possible that convolution can be applied in the frequency domain instead of the spatial domain. For example filtering in the frequency domain can involve application of FFT algorithms.

All such variations and modifications are to be considered within the scope of the present invention the nature of which is to be determined from the foregoing description.

The invention claimed is:

1. A method of processing a digital image, said method comprising:
   increasing the sample resolution of the digital image, wherein the digital image includes a grid of pixels arrange in m columns and n rows and each pixel is associated with respective neighboring sample points, from a predetermined resolution including neighboring sample points to an increased resolution including intermediate sample points between adjacent of the neighboring sample points; and
   populating each of the intermediate sample points with a value representative of an influence of a predetermined number of the neighboring sample points, the influence of the predetermined number of neighboring points being weighted proportional to the proximity of the neighboring sample points relative to the respective intermediate sample points, wherein the weighted influence is determined by either:

(A)
   (i) representing one of the predetermined neighboring sample points by a one-dimensional waveform indicative of the neighboring sample point and oriented in a plane orthogonal to the grid of pixels;
   (ii) centering the indicative waveform at the neighboring sample point;
   (iii) rotating the indicative waveform about an axis within the plane orthogonal to the grid of pixels and passing through the neighboring sample point such that the indicative waveform intersects the intermediate sample point;
   (iv) determining an intersection value of the indicative waveform at the intersection of the indicative waveform and the intermediate sample point;
   (v) deriving a weighted value for the neighboring sample point from the intersection value;
   (vi) repeating (i)-(v) for each of the predetermined neighboring sample points; and
   (vii) combining each of the derived weighted values to obtain the value representative of the influence of the predetermined number of neighboring sample points on the respective intermediate point; or (B)
   (i) representing one of the intermediate sample points by a one-dimensional hypothetical waveform indicative of one of the predetermined neighboring sample points and located within a plane orthogonal to the grid of pixels;
   (ii) centering the hypothetical waveform at the intermediate sample point;
   (iii) rotating the hypothetical waveform about an axis with the plane orthogonal to the grid of pixels and passing through the intermediate sample point such that the hypothetical waveform intersects the neighboring sample point;
   (iv) determining an intersection value of the hypothetical waveform at the intersection of the hypothetical waveform and the neighboring sample point;
   (v) deriving a weighted value for the neighboring sample point from the intersection value;
   (vi) repeating (i)-(v) for each of the predetermined neighboring sample points; and
   (vii) combining each of the derived weighted values to obtain the value representative of the influence of the predetermined number of neighboring sample points on the respective intermediate point.

2. A method as defined in claim 1 wherein increasing the sample resolution involves enlarging the digital image in at least one of orthogonal x, y axes to expose additional pixels at each of the intermediate sample points to provide an enlarged grid including am columns and bn rows where a and b represents the expansion factors in the x and y axes, respectively.

3. A method as defined in claim 2 also comprising resizing or reshaping the image by deleting one or more neighboring or intermediate sample points of the enlarged grid according to a predetermined sizing or reshaping algorithm.

4. A method as defined in claim 3 also comprising shifting the enlarged digital image by translating predetermined of the neighboring sample points from existing locations in the enlarged grid to target locations in the enlarged grid according to a predetermined shifting algorithm.

5. A method as defined in claim 1 wherein the indicative waveforms or hypothetical waveforms are represented in the spatial domain by a mathematical function and are each symmetrical either side of the respective neighboring sample point.

6. A method as defined in claim 1 also comprising:
providing a digital filter having a sample resolution the same as the predetermined resolution of the digital image, said filter including a mid-point sample and a plurality of neighboring sample points either side of the mid-point sample;
applying the digital filter to the digital image where:
(i) the mid-point sample of the filter is applied to a corresponding sample point of the image;
(ii) the neighboring sample points of the filter are applied to respective of the intermediate sample points, or the neighboring sample point, of the signal.

7. A method as defined in claim 6 wherein the filter is expanded in the spatial domain prior to its application to the image.

8. A method as defined in claim 1 wherein the indicative hypothetical waveforms, or components of the indicative or hypothetical waveforms are represented by absolute results of a cosine function in the spatial domain limited to half a cycle at its midpoint.

9. A method as defined in claim 1 wherein the indicative or hypothetical waveforms or components of the indicative or hypothetical waveforms are represented by a sine function of positive values only in the spatial domain.

10. A non-transitory computer or device-readable medium including instruction for processing a digital image, wherein the digital image includes a grid of pixels arranged in m columns and n rows and each pixel is associated with respective neighboring sample points, wherein said instructions when executed by a processor cause said processor to:
increase the sample resolution of the digital image from a predetermined resolution including neighboring sample points to an increased resolution including intermediate sample points between adjacent of the neighboring sample points; and
populate each of the intermediate sample points with a value representative of an influence of a predetermined number of the neighboring sample points, the influence of the predetermined number of neighboring points being weighted proportional to the proximity of the neighboring sample points relative to the respective intermediate sample points, the instructions comprising further instructions, that when executed by the processor, cause the said processor to either:
(A)
   (i) represent one of the predetermined neighboring sample points by a one-dimensional waveform indicative of the neighboring sample point and oriented in a plane orthogonal to the grid of pixels;
   (ii) center the indicative waveform at the neighboring sample point;
   (iii) rotate the indicative waveform about an axis within the plane orthogonal to the grid of pixels and passing through the neighboring sample point such that the indicative waveform intersects the intermediate sample point;
   (iv) determine an intersection value of the indicative waveform at the intersection of the indicative waveform and the intermediate sample point;
   (v) derive a weighted value for the neighboring sample point from the intersection value;
   (vi) repeat (i)-(v) for each of the predetermined neighboring sample points; and
   (vii) combine each of the derived weighted values to obtain the value representative of the influence of the predetermined number of neighboring sample points on the respective intermediate point; or
(B)
   (i) represent one of the intermediate sample points by a one-dimensional hypothetical waveform indicative of one of the predetermined neighboring sample points and located within a plane orthogonal to the grid of pixels;
   (ii) center the hypothetical waveform at the intermediate sample point;
   (iii) rotate the hypothetical waveform about an axis with the plane orthogonal to the grid of pixels and passing through the intermediate sample point such that the hypothetical waveform intersects the neighboring sample point;
   (iv) determine an intersection value of the hypothetical waveform at the intersection of the hypothetical waveform and the neighboring sample point;
   (v) derive a weighted value for the neighboring sample point from the intersection value;
   (vi) repeat (i)-(v) for each of the predetermined neighboring sample points; and
   (vii) combine each of the derived weighted values to obtain the value representative of the influence of the predetermined number of neighboring sample points on the respective intermediate point.

11. A computer system for processing a digital image, said system comprising a processor configured to:
increase the sample resolution of the digital image, wherein the digital image includes a grid of pixels arranged in m columns and n rows and each pixel is associated with respective neighboring sample points, from a predetermined resolution including neighboring sample points to an increased resolution including intermediate sample points between adjacent of the neighboring sample points;
populate each of the intermediate sample points with a value representative of an influence of a predetermined number of the neighboring sample points, on the respective intermediate sample point, said influence being weighted proportional to the proximity of the neighboring sample points relative to the respective intermediate points, whereby the processor is further configured to:
(A)
   (i) represent one of the predetermined neighboring sample points by a one-dimensional waveform indicative of the neighboring sample point and oriented in a plane orthogonal to the grid of pixels;
   (ii) center the indicative waveform at the neighboring sample point;
   (iii) rotate the indicative waveform about an axis within the plane orthogonal to the grid of pixels and passing through the neighboring sample point such that the indicative waveform intersects the intermediate sample point;
   (iv) determine an intersection value of the indicative waveform at the intersection of the indicative waveform and the intermediate sample point;
   (v) derive a weighted value for the neighboring sample point from the intersection value;
   (vi) repeat (i)-(v) for each of the predetermined neighboring sample points; and
   (vii) combine each of the derived weighted values to obtain the value representative of the influence of the predetermined number of neighboring sample points on the respective intermediate point; or (B)
- (i) represent one of the intermediate sample points by a one-dimensional hypothetical waveform indicative of one of the predetermined neighboring sample points and located within a plane orthogonal to the grid of pixels;
- (ii) center the hypothetical waveform at the intermediate sample point;
- (iii) rotate the hypothetical waveform about an axis with the plane orthogonal to the grid of pixels and passing through the intermediate sample point such that the hypothetical waveform intersects the neighboring sample point;
- (iv) determine an intersection value of the hypothetical waveform at the intersection of the hypothetical waveform and the neighboring sample point;
- (v) derive a weighted value for the neighboring sample point from the intersection value;
- (vi) repeat (i)-(v) for each of the predetermined neighboring sample points; and
- (vii) combine each of the derived weighted values to obtain the value representative of the influence of the predetermined number of neighboring sample points on the respective intermediate point.

* * * * *